United States Patent [19]
Sakai

[11] 3,952,230
[45] Apr. 20, 1976

[54] MATRIX TYPE GAS DISCHARGE DISPLAY DEVICE
[75] Inventor: Tetsuo Sakai, Tokyo, Japan
[73] Assignee: Nippon Hoso Kyokai, Tokyo, Japan
[22] Filed: Nov. 14, 1974
[21] Appl. No.: 523,748

[30] Foreign Application Priority Data
Nov. 19, 1973 Japan.............................. 48-129891

[52] U.S. Cl........................... 315/169 TV; 313/217; 315/84.5
[51] Int. Cl.².......................................... H05B 37/00
[58] Field of Search..... 313/217; 315/84.5, 169 TV, 315/169 R

[56] References Cited
UNITED STATES PATENTS
3,042,823  7/1962  Willard........................... 315/169 R Primary Examiner—R. V. Rolinec
Assistant Examiner—Lawrence J. Dahl
Attorney, Agent, or Firm—Stevens, Davis, Miller & Mosher

[57] ABSTRACT

In a matrix type gas discharge display device comprising a number of discharge elements at the crossings of the rows and columns of the display matrix, a group of display anodes is disposed at each discharge element by using a corresponding number of insulated wires and by removing insulation of one wire at each discharge element, and such exposed portion is shifted to a successive one of the wires every one of the crossings in a column, so that when the field scanning is made in the column direction, each different anode wire in a group operates successively in cyclic order. The applied scanning voltage is so controlled as to make such successive operation of the anodes. By such a field scanning, each discharge element luminates for a duration which is an integral multiple due to such number, of the duration in the conventional type device provided with only one display anode for each discharge element. The brightness of the displayed picture is increased up to an extent by such integral multiple in a definite and stable manner, and thus noise in the displayed picture can be decreased.

5 Claims, 6 Drawing Figures

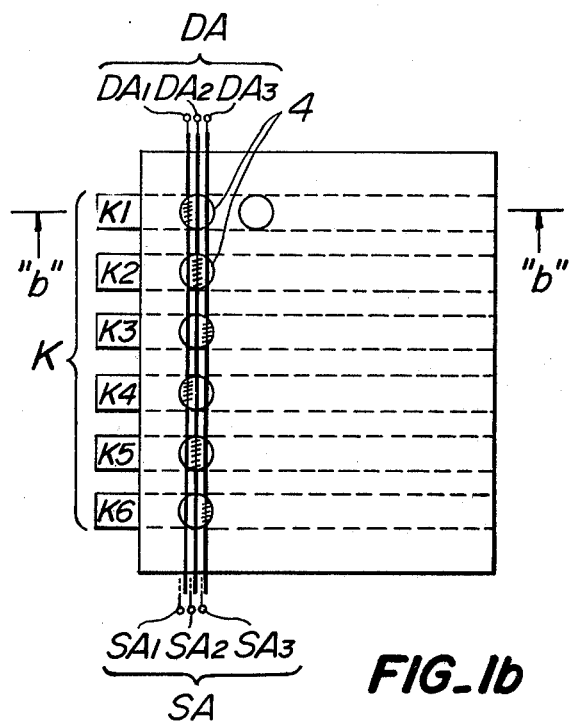
FIG_1a
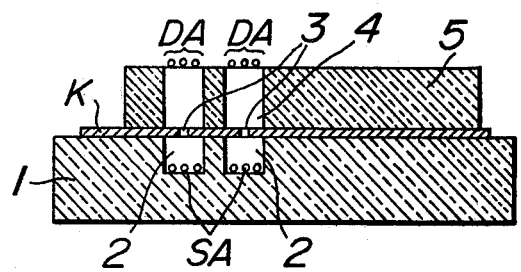
FIG_1b
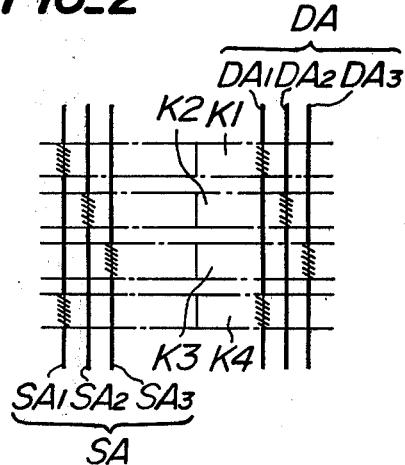
FIG_2

FIG_3
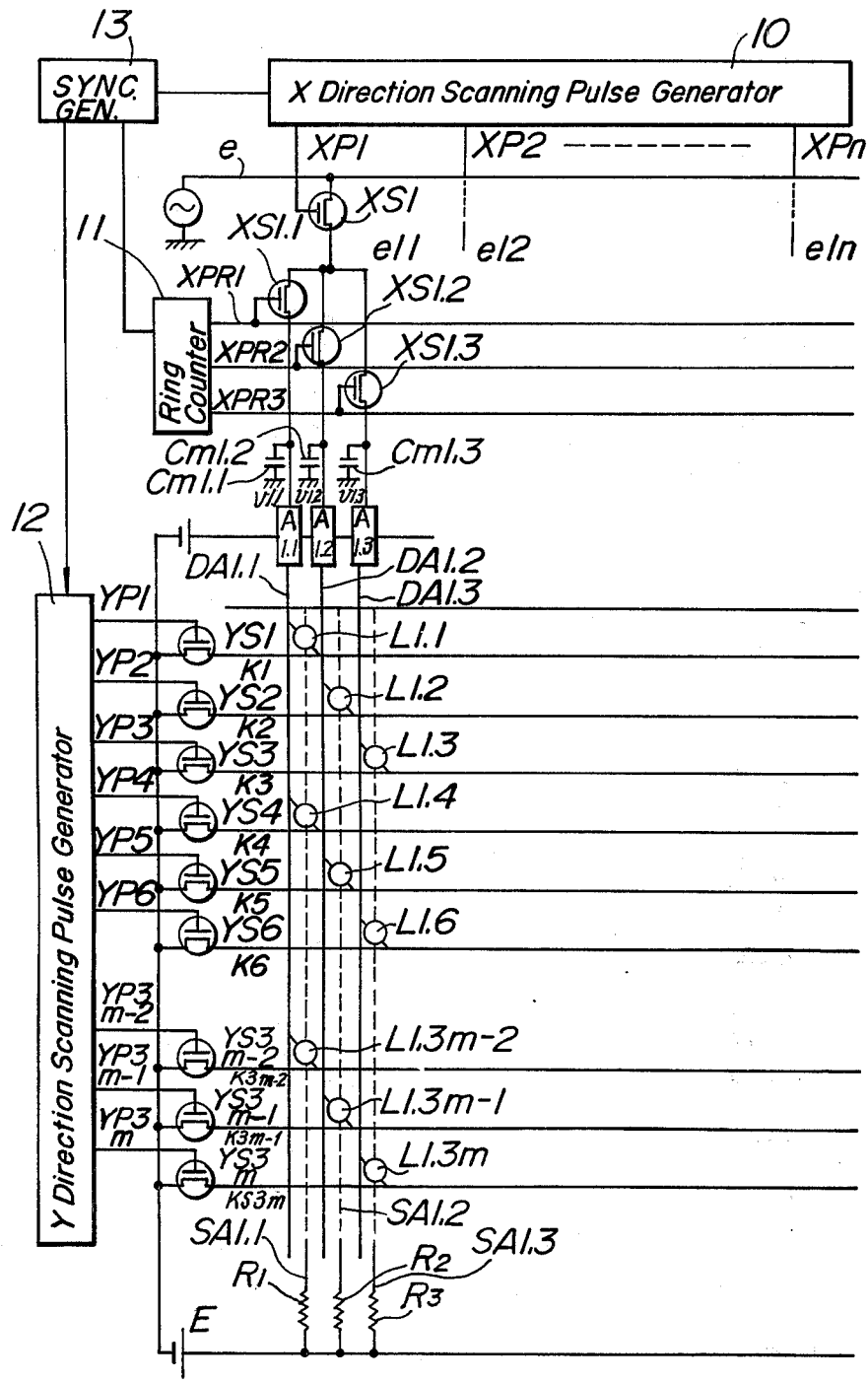

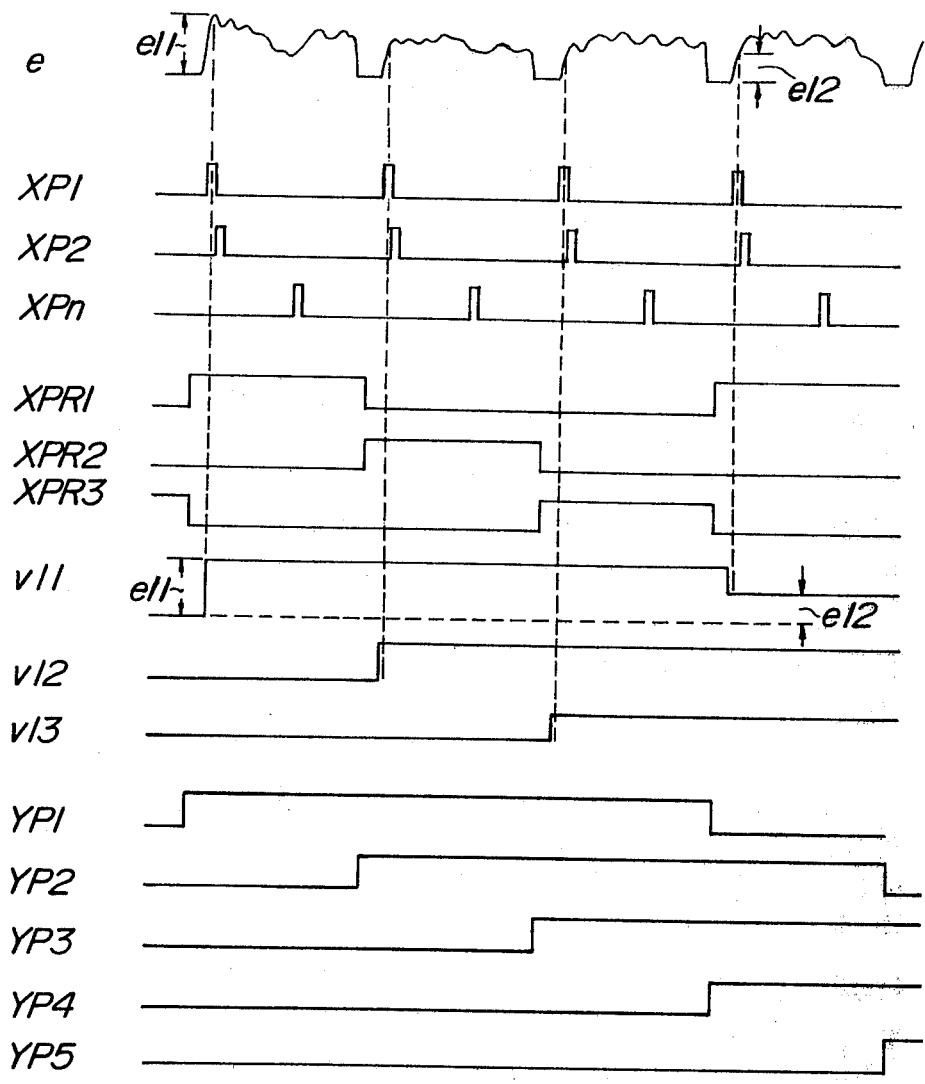
FIG_4
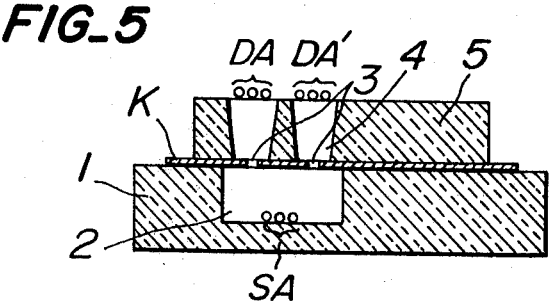
FIG_5

MATRIX TYPE GAS DISCHARGE DISPLAY DEVICE

BACKGROUND OF THE INVENTION

1. Field of the Invention:

The present invention relates to an improvement in operational function of a matrix type gas discharge display device. The gas discharge display device to be improved in accordance with the present invention comprises an airtight container or envelope filled with gas and an electrode system sealed in the envelope. The electrode system comprises a plurality of parallel stripe shaped cathode conductors, and a number of groups of parallel wires extending normal to said cathode stripes and forming display anodes and scanning anodes to provide a matrix having rows and columns together with the cathode stripes. Each of the crossings of the rows and columns of the matrix constitutes a discharge element. The scanning anodes produce priming discharges successively at the discharge elements in a row according to an applied scanning voltage and the discharge elements successively produce display discharges according to an applied information signal voltage between the group of display anodes and said cathodes to reproduce a display picture.

2. Description of the Prior Art:

Several kinds of the matrix type gas discharge display devices are known already. In the conventional matrix type gas discharge display device not provided with the priming discharge producing mechanism, each discharge element luminates for a period $Tl$ during which the signal voltage is applied and the period $Tl$ is equal to a line scanning time $Th$ for scanning a row of said matrix. This time Th is the same as a sampling period in the row direction of the picture signal to be applied simultaneously in the column direction of the matrix. In an ordinary picture display such as a display of a television picture, the field scanning (scanning in the column direction) frequency is chosen to be 50 to 100 Hz in order not to produce flickers in the displayed picture. Accordingly the field scanning period $Tf$ which is the inverse of the scanning frequency is limited to a range of 10 to 20 milliseconds. If we assume the number of the column signal wires or the number of the wires for applying the scanning voltage in the column direction of the matrix to be $m$ and one frame picture is formed by $q$ field scanning by an interlaced scanning, the field scanning period Tf is given by the following equation.

$$Tf = (m/q) \cdot Th$$

If it is assumed that the field number $q=1$ for forming one frame picture and the interlaced scanning is not effected, then the one row scanning period Th is given by the above equation as follows.

$$Th = Tf/m$$

As can be seen clearly from the above equation, if we intend to increase the number $m$ of the row signal wires, namely if the number of scanning lines is to be increased so as to obtain a high definition picture, then the line or row scanning period becomes shorter. This results also in a decrease of duration of illumination of each discharge element and hence the obtained picture becomes more dark.

A same disadvantage is also expected with a gas discharge display device provided with a priming discharge producing mechanism.

It has been proposed to improve such disadvantage by extending the luminating duration $Tl$ of the display element for a period more than twice of the row scanning period Th. One such proposal is to apply the signal voltage via a time function circuit to a discharge element and to control the time of the varying signal voltage along with the time function curve before the voltage reaches the ignition voltage; the luminance is varied according to the length of the discharge time. This known system has a disadvantage in that it can be applied only to a gas discharge display device not having the priming discharge producing mechanism, so that the control of discharge duration is not stable and definite.

On the other hand it has been considered as an inevitable condition to provide said priming discharge producing function in a gas discharge display device in order to extend the discharge duration of the discharge element so as to increase the brightness of the picture to be displayed by the discharge by making an earlier rise time of the discharge. Accordingly, it is quite apparent that such a gas discharge display device having the priming discharge producing function is also desired to be improved from the aforementioned disadvantage. Furthermore, the fluctuation of starting time of discharge of the discharge elements in a gas discharge display device should be decreased to improve the influence of said fluctuation on the brightness of the displayed picture. Also the discharge of the discharge element should continue longer than a certain limit so as to increase the brightness of a discharge element.

SUMMARY OF THE INVENTION

An object of the present invention is to obtain a suitable arrangement of the discharge electrodes in a matrix type gas discharge display device so as to extend the luminant duration of the discharge elements in a stable and definite manner and thus to increase the brightness of the display luminance and to decrease fluctuation of the starting time of the discharge.

The matrix type gas discharge device according to the present invention comprises a gas filled envelope and an electrode system provided therein. The electrode system consists of a number of parallel stripe cathode conductors, and a number of groups of display anodes and of scanning electrodes each formed by a plurality of parallel extended wires extending normally to said cathode stripes. The groups of display anodes and the groups of scanning electrodes are arranged to form a matrix having rows and columns intersecting perpendicularly together with the cathode stripes. The device includes an insulating plate provided with a number of small holes at locations of the crossings of the matrix. Each group of the number of groups of the display anodes and the scanning anodes is formed of a number of insulated conductor wires arranged in a respective number for each of the small holes to form the discharge element. In each group of said insulated conductor wires being so arranged as mentioned above, the insulation is removed from a respective one of said wires at every one of the crossings; with said cathode stripes. The removal of insulation is successively performed in cyclic order at the successive crossing with the cathodes. This insulation removal is effected for both the display anode and the corresponding scanning anode at each of the crossings. Each group of the wires forming the group of the display anodes and the scanning anodes is supplied with successively phase shifted row scanning voltages and column scanning voltages, and as a result the respective discharge element continues a stable discharge for a period corresponding to an integral multiple of the row scanning period, thus to increase brightness of the luminance stably.

BRIEF DESCRIPTION OF THE DRAWINGS

FIG. 1a shows a plan view of an embodiment of a matrix type gas discharge display device according to the present invention;

FIG. 1b is a cross-section along line b-b of the device shown in FIG. 1a;

FIG. 2 shows the relative disposition of the electrodes shown in FIGS. 1a and 1b;

FIG. 3 is a circuit diagram of the peripheral circuit to be connected to the device shown in FIGS. 1a and 1b;

FIG. 4 shows voltage waveforms at various portions of the circuit shown in FIG. 3; and FIG. 5 shows a modified embodiment of the gas discharge display device according to the present invention in cross-sectional view, in which one set of scanning electrodes is used for producing priming discharge in common with two discharge elements.

DESCRIPTION OF THE PREFERRED EMBODIMENTS

The matrix type gas discharge display device having a priming discharge producing function according to the present invention comprises an integral number of rows luminating simultaneously. Said integral number of 2 or more than 2 is represented by $p$. A duration $Tl$ during which each of the discharge elements luminates continuously is given by the following equation.

$$Tl = p \cdot Th$$

$Th$ is the term required for the row scanning. The principle of the present invention is explained by referring to FIGS. 1a and 1b for a case of $p=3$, i.e. the number of rows having simultaneously luminating discharge elements is 3.

As shown in plan view of FIG. 1a and cross-sectional view of FIG. 1b, the matrix type gas discharge display device according to the present invention comprises a set of three scanning anodes SA arranged in a column. Each of the scanning anodes SA (SA1, SA2, SA3) is formed of insulated conductor wire of which insulation coating is partly removed to expose the conductor wire at desired crossings with rows of cathodes K1, K2 . . . For instance a scanning anode SA1 has the insulation coating removed at the crossings with cathodes K1, K4 . . . The exposed conductor portion is indicated by hatchings on the lines indicated DA which will be explained later.

As can be seen more clearly from FIG. 1b, said set of scanning anodes SA (SA1, SA2, SA3) are located at the bottom of a slot 2 provided on a surface of a rear panel 1 forming a part of the envelope of the display device. A plurality of identical slots 2 are provided in parallel with each other and in a vertical direction and they form columns of the matrix, although only a part of them are shown in the drawing. The conductors forming each set of the scanning anodes SA are provided in parallel with each other in the slot 2. Above the surface of the rear panel 1 a plurality of cathodes K1, K2, K3 . . . made of stripe shaped conductors are arranged in parallel with each other and in the horizontal direction so as to form rows of the matrix. Each cathode K is provided with a small pinhole 3 at each crossing with the slot 2. The cathode K and the slot 2 or the scanning anode SA intersect normally at each crossing.

Over the horizontal rows of the cathodes K an insulator plate 5 is provided so as to sandwich the cathode conductors together with the rear panel 1 forming a base portion of the envelope of a display panel. The insulator plate 5 is provided with a number of small holes 4 at locations over each of the crossings with the slots 2. In the drawing the holes 4 are shown in exaggerated size for clarity. Over the insulator plate 5 a number of groups of display anodes DA are provided. The set of the display anodes DA (DA1, DA2, DA3) are provided over the small holes 4 of the insulator plate 5 in parallel with each other and in a vertical direction to form a column of the matrix. The display anodes DA are also made of insulated conductor wires just in the same manner as the scanning anodes SA. The insulation coating of the insulated conductor wire forming the display anode is removed at each third location of the crossings with the cathode stripes K where the insulator of the corresponding scanning anode SA is also removed. The cross hatching on the wire DA in FIG. 1a indicates symbolically such removal of the insulation.

FIG. 2 is a view for illustrating more clearly the relative positional relationship between the display anodes DA and the cathodes K and between the scanning anodes SA and the cathodes K. In actual construction, the display anodes DA are provided in a position overlapping with the scanning anodes SA, so that both anodes are shown for convenience at different locations of FIG. 2. But this is just for purposes of illustration and in practice the anodes DA and SA overlap one another as shown in FIG. 1a. Also in FIG. 2, the exposed conductor portion is shown by hatching. As explained already, the insulation coating is removed at a respective one of the crossings. For instance, if we consider a cathode stripe K1, only the display anode DA1 and the scanning anode SA1 have the insulation coating removed and the other anodes i.e. display anodes DA2 and DA3 and scanning anodes SA2 and SA3 remain insulated. In the same manner with respect to cathode K2, only the anodes DA2 and SA2 have the insulation coating removed and the other anodes are left in an insulated condition.

FIG. 3 shows a peripheral circuit to be connected to the display anodes DA, the cathodes K and the scanning anodes SA of the gas discharge display device according to the present invention. FIG. 4 shows voltage waveforms to be applied to the various electrodes of the device.

In FIG. 3, 10 is an X direction scanning pulse generator producing X direction or row scanning pulses XP1, XP2, . . . XPn. The generator 10 is just the same as that of a conventional display device luminating only one row at a time which is considered as a case of $p=1$. In the matrix display device according to the present invention, a ring counter 11 is newly added. The ring counter 11 produces gate pulses XPR1, XPR2, XPR3 successively for driving gate elements XS1.1, XS1.2, XS1.3 which supply X direction scanning pulses for the respective set of display anodes DA1.1, DA1.2, DA1.3 and to a respective set of scanning anodes SA1.1, SA1.2, SA1.3. In the present embodiment, wherein $p=3$ in which 3 rows luminate as a group, the gate pulses XPR1, XPR2, XPR3 are 3 phase pulses having a duration of 3Th (3 times the row scanning period Th). Each of the gate switches XS1.1, XS1.2 and XS1.3 turns on for a period of one row scanning period of 3 Th, and some of them turn on successively for a period.

At the output side of the gate switch XS1.1, a memory condensor Cm1.1 is connected. In the same manner a memory condensor Cm1.2 is connected at an output of the gate switch XS1.2 and a condensor Cm1.3 is connected at an output of a gate XS1.3. The memory condensors Cm1.1, CM1.2, CM1.3 hold a signal voltage to be displayed on the first row scanning and at the 1st column position for a period of 3Th, by the action of a sampled signal voltage $e_{11}$ gated out by the gate switch XS1 which operates to gate out a sampled signal for the 1st column out of one row display signal successively by a pulse voltage XP1 delivered from the X direction scanning pulse generator 10, and distributed into respective memory condensers by the pulse voltages XPR1, XPR2, XPR3 delivered from the ring counter 11. Namely, in FIG. 3, a pulse voltage XP1 delivered from X direction scanning pulse generator 10 is applied to the gate switch XS1 and a pulse voltage XPR1 derived from the ring counter 11 is applied to a gate switch XS1.1. During a time when both gate switches XS1 and XS1.1 are in the ON condition, a picture signal voltage $e$, for instance a television signal, is sampled as $e_{11}$ and the gated out voltage $e_{11}$ is fed to the memory condensor Cm1.1 and held for a period of 3Th therein. A line $v_{11}$ of FIG. 4 illustrates this operation.

The applied control voltage for the gate switch XS1.1 is the output pulse XPR1 of the ring counter 11 as shown in FIG. 4 on the line indicated as XPR1. The succeeding occasion at which both the gate switches XS1 and XS1.1 are in the ON condition is at a time of lapse of 3Th period as shown by the 4th vertical dotted line from left in FIG. 4. At this time the picture information signal voltage $e$ having a value of $e_{12}$ is sampled and fed to the condenser Cm1.1 and is held for the succeeding 3Th period.

Thus memorized, a signal voltage $e_{11}$ or $e_{12}$ held in the memory condensor Cm1.1 is fed to a display anode DA1.1 via a driving circuit A1.1. The display anode DA1.1 forms display elements at the crossing with the cathodes K1, K4, . . . These display elements are indicated by L1.1, L1.4, . . . A display element is essentially a luminating element but it may be formed as a light quantity controlling element.

In the display element L1.1, the display anode DA1.1 is applied with a voltage $e_{11}$ via the driving circuit A1.1 which is in proportion to the picture signal to be displayed and on the other hand the cathode K1 is applied with Y direction scanning pulse YP1 originating from a Y direction scanning pulse generator 12 and delivered through a gate switch YS1. The pulse voltage YP1 is a pulse for making Y or column direction scanning and has a duration of 3Th as indicated in FIG. 4. The display element L1.1 initiates the luminance at a time when both the gate switch YS1 and XS1.1 are in the ON condition as indicated at the extreme left side vertical dotted line in FIG. 4. This luminance is in proportion to the sampled voltage $e_{11}$ of the picture signal $e$ and the element L1.1 continues the luminant condition for a period of 3Th.

The other display elements L1.2 and L1.3 luminate in the same manner as L1.1 but at an instance shifted by one Th period from each other and continue each luminant condition for a 3Th period. When the display elements L1.1, L1.2, . . . Ln.m are formed as discharge elements provided with no mechanism for producing the priming discharge, a disadvantage may be caused; for instance, the discharge rise time may be delayed, and initiation of the discharge may fluctuate so as to cause noise in the displayed picture as explained in the foregoing. Furthermore, in case only one scanning anode SA is provided in a column of display elements as in the case of the conventional device, a group of three cathodes arranged opposite the scanning anode SA, for instance cathodes K1, K2, K3, are all at a low voltage in some instance, therefore the discharge operation may be indefinite due to the fact that it is not decided onto which one of the cathodes the scanning anode should start discharge. A simultaneous starting of discharge onto three of the cathodes is not possible in a normal glow discharge region. Accordingly, by providing only one scanning anode for a number of discharge elements in a column, it is difficult to realize the priming discharge function to induce instantaneous and definite display discharge.

In the matrix type gas discharge display device according to one embodiment of the present invention as has been explained by referring to FIGS. 1a, 1b and 2, three scanning anodes SA1, SA2, SA3 are provided in a column. Each scanning anode is formed by removing the insulation coating at one crossing with the cathode stripes out of three crossings wherein a corresponding display anode also has the insulation coating removed to form a display element. As can be seen from the bottom side of FIG. 3, to the three scanning anodes SA1, SA2, SA3 a dc voltage E is applied via respective current limiting resistors R1, R2, R3. Therefore each scanning anode SA1.1, SA1.2 or SA1.3 can establish a respective priming discharge for respective cathodes K independently from each other. Thus an independently produced priming discharge is used for initiating display discharge at each of the display discharge elements.

The matrix type gas discharge display device shown in FIG. 3 is a non-self scanning type. In a self scanning type display device, if the number of rows of simultaneously luminant discharge elements is selected as $p=3$, the alternate voltage for column scanning should be selected for at least 5 phases or in general to be selected as (P+2) phases. This can be achieved in the following manner. Namely, all the gate switches after YS6 are dispensed with and only five gates i.e. YS1, YS2, . . . YS5 are used. The cathodes successively disposed from top to bottom (column direction) are divided into 5 groups as follows.

```
K1 group . . . K1, K6, K11, K16 . . .
K2 group . . . K2, K7, K12, K17 . . .
K3 group . . . K3, K8, K13, K18 . . .
K4 group . . . K4, K9, K14, K19 . . .
K5 group, . . . K5, K10, K15, K20 . . .
```

The cathodes in one group, for instance K1, K6, K11 . . . , etc. are mutually connected. At first a reset cathode KR located at the top end of the matrix is applied with a reset pulse voltage to initiate a discharge from the top end of the matrix. Then the discharge is transferred to the cathode K1. Thereafter the discharge is successively transferred to K2 while the cathode K1 is left discharged. Then the cathode K3 is transferred with discharge while K1 and K2 are left discharged. At transfer to the cathode K4, the voltage for the cathode group K1 is raised to approach the voltage of the scanning anode SA to extinguish the discharge at the cathode K1 and a discharge at cathode K4 is initiated.

In the same manner, the discharge at the cathode K2 is extinguished and is started at the cathode K5. Then the cathode K6 should be started. In this case as the cathodes K1 and K6 are mutually connected, both K1 and K6 are at low voltage and are in a condition of easily starting the discharge. However, as in a scanning of a self-scanning type panel display (SSPD), the cathode K2 does not discharge and the cathode K5 discharges in this case, so that the cathode K6, which is nearer to the discharging cathode K5 than the cathode K1, receives the transfer of the discharge from the cathode K5. In the same manner the self-scanning is carried on.

In FIG. 3, the X direction scanning pulse generator 10, the ring counter 11 and the Y direction scanning pulse generator 12 are all controlled in synchronism by a synchronizing signal generator 13.

The idea of the present invention to extend the luminant period of the discharge elements may easily be applied for any kind of matrix type gas discharge display device provided with auxiliary electrodes for producing the priming discharge and having matrix configuration arrangement in rows and columns for the cathodes and the display and scanning anodes. The idea mentioned above can be applied equally for all of such display devices irrespective of their construction, namely the polarity of applied voltages for the electrodes, the relative disposition of the electrodes, the structure of the discharge elements, and the method of varying the luminance of the gas discharge. For instance, the priming discharge system of the present invention may be applied for a case in which the cathodes and anodes are reversed. Namely, the system may be applied for a case in which the scanning electrodes are operated as cathodes.

In the aforementioned embodiment, the groups of scanning electrodes are provided on opposite sides of the groups of the display anodes with respect to the group of cathode stripe electrodes. The present invention may equally be applied to a case in which the groups of the scanning electrodes and the groups of the display electrodes are provided on one side of the cathode groups at shifted positions separated by partitions.

Furthermore, the invention may be applied in a modified embodiment of the device, in which the driving signal voltage applied to the display elements varies the duration in proportion to the sampled picture signal voltage instead of varying amplitude of the voltage as explained in the foregoing embodiment.

Furthermore, one set of scanning auxiliary electrodes may be used for producing the priming discharge for a plurality of discharge elements in common. FIG. 5 illustrates one embodiment for such case in which one set of three scanning electrodes SA is used for producing the priming discharge for two display elements made of two groups of display electrodes DA and DA'. The construction and operation of the other portion are the same as that of the embodiment shown in FIG. 1b so that a detailed explanation is omitted.

This system may also be applied well for a color discharge display device. In this case phosphorescent layers for primary colors may be applied for instance at the side surface of the small hole 4 or at the surface of the cathode 3 in respective display elements.

In the matrix shaped gas discharge display device according to the present invention, the luminant duration of the discharge element may be extended if compared with conventional devices so that brightness of the lumination is made much higher. Since the device is also equipped with a definite priming discharge producing mechanism, various advantages may be obtained such that the deviation of starting time of the discharge is decreased and the irregularity of luminance or noise included in the displayed picture may be decreased.

Although the invention has been described by referring to a particular embodiment, it can be applied for various modifications without departing from the scope of the appended claims.

What is claimed is:

1. A matrix type gas discharge display device having a gas filled airtight envelope, comprising:
  a number of first groups of insulated conductor wires provided in a number of parallel partitions of an insulated panel for forming a part of said envelope, and extending in parallel for forming scanning electrodes of the display device;
  a plurality of parallel stripe shaped cathode conductors provided over the partitions of the panel and extending perpendicularly to said scanning electrodes for forming parallel rows of a matrix of the display device;
  a number of second groups of insulated conductor wires provided on the frontside of and apart from said parallel stripe shaped conductors, and extending in parallel with each other and with said first groups of wires for forming columns of the matrix display device,
  wherein, said first and second groups of insulated conductor wires and said stripe shaped conductors form discharge elements on each of the crossings of said rows and columns of the matrix display device,
  said first and second groups of insulated conductor wires being arranged in a cyclic order such that a respective one wire of said first and second groups of wires is not insulated at a location of every one of said discharge elements to form a respective scanning electrode and display anode of each discharge element while the other wires of each of said groups are insulated at such location, and
  the order of said one wire for forming the respective scanning electrode and display anode of each discharge element is successively shifted within a respective one group of said wires according to the order of successive positions of the discharge elements in each column of the matrix.

2. A matrix type gas discharge display device as claimed in claim 1, which, in each column of the display matrix, comprises:
  a means for sampling an information signal for a period corresponding to row direction scanning of the display matrix by row direction scanning pulses successively phase shifted in the order of respective columns of the display matrix;
  a means for holding the sampled information signal for a duration corresponding to an integral multiple of one row direction scanning period of the display matrix, the integral multiple being equal to the number of conductor wires forming a group of the display anodes, and for applying the sample held information signal in cyclic order to a respective one of said conductor wires forming a group of the display anodes; and a means for applying successively phase shifted column direction scanning pulses between successive ones of the parallel stripe shaped cathode conductors forming parallel rows of the display matrix and a group of conductor wires forming the scanning electrodes, in common with each column of the display matrix, to produce priming discharge for initiating display discharge into discharge elements respectively applied with the sample held information signal, so that each of the display elements formed on each of the crossings of said rows and columns of the display matrix luminates with the luminance corresponding to respective sample-held information signals for a period corresponding to said integral multiple of one row direction scanning period of the display matrix.

3. A matrix type gas discharge display device as claimed in claim 2, wherein said integral multiple represents the number of discharge elements in a column luminating simultaneously at least for a part of the luminating duration of each discharge element, and the integral multiple is at least equal to 2.

4. A matrix type gas discharge display device as claimed in claim 2, comprising a ring counter producing gate pulses for successively gating said sampled information signal into a memory element of said holding means at one sampling time thereof.

5. A matrix type gas discharge display device as claimed in claim 2, wherein each group of conductor wires forming the scanning electrodes supplies priming discharge produced between said electrodes and each of said cathode conductors to a plurality of discharge elements in common.

* * * * *